United States Patent [19]
Winters et al.

[11] 3,919,148
[45] Nov. 11, 1975

[54] PAVEMENT COMPOSITION

[76] Inventors: Robert E. Winters, 1533 Fishburn Ave., Los Angeles, Calif. 90063; Charles H. McDonald, 3130 W. Pierce St., Phoenix, Ariz. 85009

[22] Filed: Aug. 26, 1974

[21] Appl. No.: 500,348

Related U.S. Application Data

[60] Division of Ser. No. 381,272, July 20, 1973, Pat. No. 3,844,668, which is a continuation of Ser. No. 217,516, Jan. 13, 1972, abandoned.

[52] U.S. Cl. .................. 260/28.5 AS; 260/33.6 A; 260/33.6 UA; 260/33.8 R; 260/33.8 UA; 260/718; 260/758
[51] Int. Cl.² .......................................... C08L 95/00
[58] Field of Search ........... 260/718, 758, 28.5 AS, 260/33.6 A, 33.6 UA, 33.8 R, 33.8 UA

[56] References Cited
UNITED STATES PATENTS
3,338,849   8/1967   Johnson .......................... 260/4 R

OTHER PUBLICATIONS
McDonald, "A New Patching Material for Pavement Failures," Highway Research Record No. 146, 1966, pp. 1–15.

*Primary Examiner*—Melvyn I. Marquis
*Attorney, Agent, or Firm*—William G. Lane

[57] ABSTRACT

An elastomeric paving material that can be applied with conventional equipment. The material is prepared from paving asphalt, asphalt-soluble, non-oil resistant rubbers and an asphalt solvent. The asphalt and rubber are reacted to form a hot thick viscous jellied composition. The hot jellied composition is mixed with 20% by volume or less of the asphalt solvent to prepare the elastomeric paving material. The material will maintain a low viscosity for a period of time for workability; then it will rapidly increase its viscosity, independent of solvent loss, and set-up.

17 Claims, 4 Drawing Figures

PAVEMENT COMPOSITION

This is a divisional application of pending application Ser. No. 38,272, filed: July 20, 1973 now U.S. Pat. No. 3,844,668 which in turn is a continuation application of application Ser. No. 217,516, filed Jan. 13, 1972, now abandoned.

BACKGROUND OF THE INVENTION

For the past hundred years there have been many attempts to prepare an elastomeric material which can be utilized in road repairs and roofing material which will have a substantial life of at least five or more years. Typical examples are disclosed in U.S. Pat. Nos. 2,310,972; 2,700,655; 2,578,001; 3,049,836; 3,253,521; 3,270,631; 3,338,849; 3,340,780; and the Davison Canadian Pat. No. 740,027. None of these materials have been particularly effective for a variety of reasons. The most common shortcoming is their limited elastomeric properties. When used in road repair they hide the underlying cracks and holes for a short period until the road settles further and the hole or crack is reflected upward through the material, creating new cracks and holes. When used in roofing, they frequently crack in areas where the roofing structure undergoes temperature changes, dynamic settling, twisting or other types of changes and movement.

Charles H. McDonald and John P. Harmon invented an elastomeric pavement composition which is described in the following papers: *Highway Research Record*, No. 146, Highway Research Board published December 1966, Washington, D.C., pages 1–16; An Elastomer Solution for "Alligator" Pattern, or Fatigue, Cracking in Asphalt Pavement, presented at the International Symposium on the use of Rubber in asphalt pavements, in Salt Lake City, Utah, May 10–12, 1971; Bituminous Paving as Related to Large Commercial Airports in an Urban Environment, presented at the Symposium on Design and Performance of Bituminous Paving in the Urban Environment, at the Fiftieth Annual Meeting of the Highway Research Board, Jan. 18–22, 1971, Washington, D.C: Corrective Measures for Asphalt Pavement Distress, presented at the Eleventh Maintenance Conference of the Arizona Highway Department, Apr. 24, 1969, Phoenix, Arizona; and An Approach to Two Types of Asphalt Pavement Failures, presented at the Eighteenth Annual Conference on Roads and Streets, at the University of Arizona, Tucson, Arizona (1969).

The elastomeric paving material invented by McDonald and Harmon consists essentially of paving grade asphalt and rubber which has been reacted in a ratio of about two to about three parts asphalt to about one part rubber and which had been heated together at a temperature in the range of about 350° and about 500°F. to form a very viscous jelly composition. After application and cooling, the material is very strong and yet quite elastomeric and has successfully withstood uninterrupted and uncorrected use on airports, mountain highways, streets and roads in several Western states which experienced below freezing temperatures in the winter with temperatures exceeding 100°F. in the summer (see the above McDonald papers). Although the elastomeric pavement material has seen great commercial use, it has one drawback: the jellied material is quite viscous and requires a certain amount of expertise in application. Because of the viscous nature of the material, special equipment has been required for its application. The material must be applied before it set up and the chips of aggregate must be applied to the layer of the material before it sets up to insure retention of the chips. There have been a few instances where the material has been applied late, that is, after the material has set up, and two occurred; have ocurred; (1) the material has started to peal from the underlying road; and-/or (2) the chips that were applied to the top of the layer of material were rapidly displaced causing the elastomeric pavement material to bear the brunt of the vehicular traffic. This frequently causes the pavement material to be rapidly worn off the road. The setting up is a complex phenomenon established by several criteria, such as heat, type of asphalt used, the granulation size of the rubber, the reaction temperature of the rubber and asphalt, temperature of the road surface to be repaired, and the air temperature.

The applicants considered cutting the rubber asphalt-rubber-jelly composition with a compatible solvent, but rapidly gave up the idea when considering the amount of solvent that would be required to lower the viscosity of the jelly composition to a workable condition, the long set-up time required through evaporation of the solvent (in a hot dry climate the solvent would evaporate rapidly, and in a cold moist climate the solvent would evaporate very slowly), the smog problem inherent in solvent evaporation, and finally the fire hazard when employing inflammable solvents. However, quite unexpectedly when the applicants tried cutting the material with the solvent, the above problems did not materialize.

SUMMARY OF THE INVENTION

The elastomeric material of the present invention is prepared from a hot asphalt-rubber-jelly composition having a high predetermined viscosity. the jelly composition is mixed with a predetermined amount of a compatible solvent to form the elastomeric material which will have a predetermined viscosity. The addition of the solvent lowers the viscosity of the composition and permits its application with existing equipment. This material can be applied, worked on and covered with chips for almost up to an hour after its application on the road. When the material begins to set up, it sets up at a very rapid rate, which is independent of the evaporation of the solvent. Once the material has set up the repaired road can be opened to vehicular traffic. The material is not limted to use in roads and can be usd for other application when elastomeric, water-tight material is needed, such as, sealing cellars, roofing applications, lining canals or culverts, applying waterproof membrances to roadbeds and the like.

DETAILED DESCRIPTION OF THE INVENTION

Figure 1:
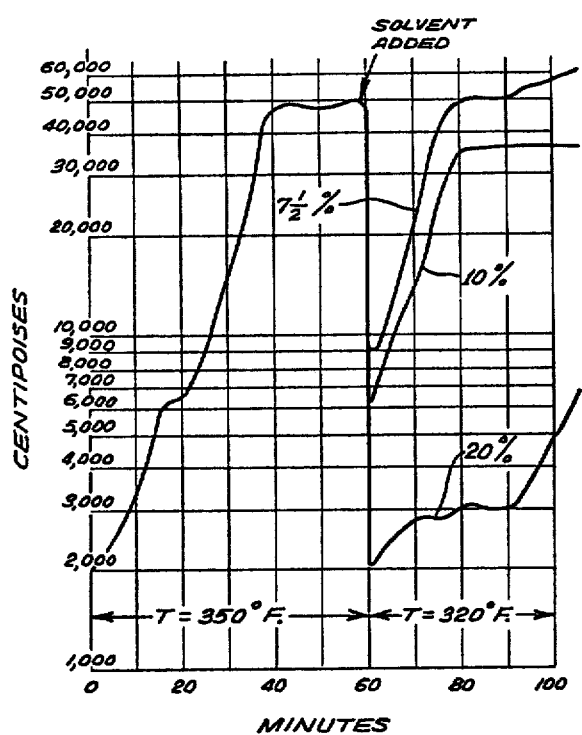
FIG. 1 is a graph showing the changes in the viscosity and the composition of this invention with respect to time.

The composition of the present invention is first prepared by preparing a jellied reaction product of paving grade asphalt and non-oil resistant, asphalt-soluble rubber. The asphalt is heated to a temperature from about 300° to about 500°F., preferably to a temperature from about 350° to about 400°F. Any type of paving grade asphalt can be employed in the present invention, including 10–10 grade, 10–20 grade, 40–50 grade, 70–80 grade, 85–100 grade, 120–150 grade, and 200–300 penetration grade paving asphalt. Normally the asphalt is heated to a sufficiently high enough temperature to reduce the initial viscosity to at least 200 centiposies, preferably less than 100 centipoises. The type or source of the asphalt plays a significant part in the viscosity asphalt and the asphalt-rubber-jellied composition; thus, accordingly, Douglas asphalt will have different viscosity characteristics than Phillips, Golden Bear, Santa Maria or Edgington asphalt, and vice versa. Although the different asphalts have different viscosity characteristics, we have found that most paving grade asphalts have a viscosity of less than a hundred centistokes at temperatures of about 350°F. or more.

After the asphalt has been heated to the desired temperature, granulated non-oil resistant, asphalt-soluble rubber is added and mixed with asphalt. The asphalt and rubber are mixed together until a jellied composition is formed; this normally takes from about 10 to about 90 minutes. One part of rubber by weight is added to each two to four parts by weight of asphalt. The rubber is granulated to a mesh size between about − 4 and about + 50 mesh (United States Standard, unless otherwise indicated, all mesh sizes described herein will be in U.S. standard. The minus sign (−) means that all (100%) of the granules passs through a screen mesh of a specified number and the plus sign (+) means that all (100%) of the granules are retained on a screen mesh of a specified number.) Preferably the rubber is granulated to a mesh size between − 16 and + 25. The mesh size has been found to be very critical. With granules smaller than 50 mesh, the rubber and asphalt form a very viscous and jellylike composition having a viscosity almost equal to 300,000 centipoises, whereas in contrast, when the rubber is employed with a mesh size between − 4 and +50 the viscosity of the jellied asphalt rubber composition rarely exceeds 100,000 centipoises. When the rubber granules exceed a 4 mesh, the asphalt-rubber-jellied composition normally has a viscosity of less than 5000 centipoises. The hot asphalt and the rubber are mixed together until they form a gel having a thick pancake-batter-like consistency. Normally the viscosity of the hot asphalt-rubber mixture will be in excess of 2000 centipoises and sometimes will approach values close to 100,000 centipoises.

Non-oil resistant, asphalt-soluble rubbers are employed in the present invention. Non-oil resistant, asphalt-soluble-rubbers are those rubbers that are partially soluble to the extent of from about 2 to about 12% in asphalt and that are attacked by, react with or are effected by oils, such as lubricating oils, hydraulic oils and the like. Suitable rubbers that can be employed include unvulcanized, vulcanized or reclaimed natural rubber (NR, polyisoprene polymer), isoprene rubber (IR, polyisoprene polymer), butadiene rubber (BR, polybutadiene polymer), butadiene-styrene rubber (SBR, butadiene-styrene copolymer), butyl rubber (IIR, the isobutylene isoprene polymer) and ethylene propylene rubber (EPM and EPDM, ethylene propylene copolymers and terpolymers).

The reclaimed rubber can be devulcanized or partially devulcanized and can be prepared from vulcanized or unvulcanized rubber by the digester process, Heater or Pan process, high pressure steam process, Lancaster-Banbury process, reclamation process or other conventional reclaiming processes (Maurice Morton, *Introduction to Rubber Technology*, Van Nostrand Reinhold Company, N.Y., 1959, pages 404–435). Normally the reclaimed rubber will be prepared from old, worn tires, tire scrap, innertube scrap, retread scrap, tire peal, tire carcass and other rubber scrap. In practice, other types of rubbers have not been found suitable. For example, rubbers which we have found not to be suitable for the composition are nitrile rubber (NBR, butadiene acrylonitrile copolymers), epichlorohydrin (ECO, epichlorohydrin polymer and copolymer), neoprene rubber (CR, chloroprene polymers), hypalon (CSM, chlorosulfonated polyethylene polymers), urethane rubber (AU, EU, urethane polymers or elastomers), polysulfide or Thiokol rubber (T, organic polysulfides), silicone rubber (Si, organic silicone polymers), fluro silicone rubber (FSi, fluorinated organic silicone polymers), fluoro elastomer (FTM, fluorocarbon polymers), acrylic rubbers and poly acrylates (ACM, copolymer of acrylic ester and acrylic halide). These rubbers have been found to be unsuitable for the present invention because they do not react in the desired manner with asphalt under the above-described conditions to form the required jellied composition. The following types of rubbers are preferred for use in this invention: (1) ground whole tires (with and without carcass fabric residue) in the range 4 mesh to 40 mesh USS; (2) tire buffings (a) by-product of tire retreading) in the range 4 mesh to 40 mesh; (3) ground innertubes (natural rubbers and synthetic butyl rubbers; and (4) reclaimed rubber (devulcanized or partially devulcanized from the above types. The above rubber types are preferred for use in this invention because of their: (a) reactivity with hot paving grade asphalt, (b) low cost (compared with virgin rubbers), and (c) ecological benefit (by lessening the impact on the environment as regards scrap rubber disposal). For purposes of this invention the following types or families of rubbers work well: (1) Natural rubber and Latex, (2) Butadiene-Styrene copolymers, (3) Cis-polybutadiene, (4) Cispolyisoprene, (5) Ethylene-Propylene Terpolymer (EPDM), (6) Isobutylene rubbers, (7) Isobutylene-Isoprene rubbers (Butyl), and (8) Reclaimed rubbers from the above types.

After the asphalt-rubber-jellied composition has attained to the desired viscosity, the jellied composition is allowed to cool from a temperature of from about 350° to about 450°F. to a cooling temperature of from about 200° to about 340°F., preferably to a temperature of from about 320° to about 340°F. The mixture is then mixed with an asphalt solvent. When the jellied composition and solvent are thoroughly mixed they form a thick liquid which can be readily applied to roofs, pavements or other surfaces with conventional spraying equipment. Normally from about 5 to about 20% of solvent by volume of the asphalt-rubber-jellied composition is added to the jellied composition, preferably about 7 ½%. The amount of solvent is critical; too little solvent and there is little difference between the viscosities of the jellied composition and the elastomeric material rendering the latter unworkable. Too much solvent, and the elastomeric material does not exhibit the rebounding effect described hereinafter. Upon the addition of the solvent, the viscosity of the composition is greatly reduced, sometimes as much as 25 fold. This resulting novel elastomeric material matinains its relatively low viscosity for a predetermined period of time, and then it suddenly and remarkably increases its viscosity to obtain the original viscosity of the asphalt-rubber-jellied composition. In most instance, the material will eventually exceed the viscosity of the jellied composition even when the temperature is maintained at the cooling temperature. This effect we have termed "rebounding." This rebounding is completely unexpected and is independent of the vaporization of the solvent from the hot material. We have made this material in open and sealed systems and have observed substantially the same effect in both systems. Even more surprisingly, after the material had been laid on the hot runway of the Phoenix Airport for more than a year, the material can be cut open with a knife and the smell of the solvent becomes very noticeable.

The asphalt solvents that are employed in the present composition have a boiling point exceeding the cooling temperature of the jellied composition when the solvent is mixed therewith. Preferably the solvent has a boiling point less than 750°F. Suitable solvents that can be employed in the present invention include aromatic and aliphatic hydrocarbons, solvent naphtha, ligroin, paint thinner, halogenated hydrocarbons, white gasoline, petroleum spirits, paraffinic oils, light oil fractions from coal tar (for example, heavy naphtha benzol, toluol, and the like) and kerosene. We have been employing kerosene in the practice of the invention because of availability and cost factors; however, we see no reason why the above-identified solvents could not be used in place thereof. Specific solvents that can be employed include benzene, naphtha, chlorododecane, carbon tetrachloride, chlorotoluene, toluene, xylenes, diesel oil, diisopropyl benzene, dry cleaning fluids, heavy gasoline, hexane, n-hexene-1, hydrauli oil, petroleum, kerosene, petroleum lubricating oils, octadecane, isooctane, paint thinners, light bituminous tars, and the like.

After the present composition has been applied to the surface to be treated, the material sets up to form a strong resilient, waterproof layer which can withstand heavy traffic, heavy smog and ozone conditions, high and low temperatures and heavy loads. Preferably, before the material sets up it is given a dressing of aggregate chips which will greatly prolong the life of the material under traffic conditions. Once the material is set up, it is no longer possible to apply the aggregate chips so that they will be retained on the material.

If the composition is made from rubber having a mesh size finer than 50 mesh, the composition does not exhibit any rebound properties. We have found that when we mde jellied composition consisting of three parts of 120–150 penetration grade asphalt (Douglas) and one part of —40 mesh to dust ground tire rubber (natural rubber and SBR), the jellied composition had a viscosity of around 250,000 centpoises. When this material is mixed with 5% by weight of kerosene, at a temperature of 320°F., the viscosity drops to 80,000 centipoises and remains at that level indefinitely. When the material is mixed with 7½% by weight kerosene, its viscosity drops to about 30,000 centipoises and remains there apparently indefinitely. When the material is mixed with 10% kerosene, the viscosity drops to the value of about 16,000 centipoises, which it apparently maintains indefinitely. Similarly, if the material is made from an asphalt-rubber-jellied composition prepared from granulated rubber larger than 4 mesh, the composition does not appear to have rebound properties. Accordingly, it is quite evident that the granulation size of the rubber employed in the elastomeric material is quite critical.

In practice we attempted to prepare an asphalt-rubber composition having a viscosity of around 2500* centipoises and then we added about 7½% kerosene to drop the viscosity to about 1600* centipoises. This latter viscosity material can be readily applied with conventional asphalt spraying equipment without fouling up the pumps and spray nozzles and pipes. Under these conditions, we normally have about 10 minutes after application before the material begins to set up. After the material has been applied, it is quickly covered with a coating of chips (between about 20 to 40 pounds of chips per square yard). In a half hour thereafter, the material is generally set up to a sufficient degree so that a repaired roadway can once again be opened to traffic.

* varies with the source of asphalt, other factors being equal.

In practicing the invention we have normally been employing reclaimed tire rubber, scrap tires that have been reduced to crumb form with and without carcass fabric residue, and rubber tire buffings from tire plants and retreading shops. These types of rubber pose substantial economic advantages over native natural rubber or new, unused SBR and other synthetic rubbers. The use of these rubber types also provide an additional outlet for old, worn tires and other forms of scrap rubber which are a tremendous waste problem and a great burden on our ecology.

PREFERRED EMBODIMENT OF THE INVENTION

The asphalt is heated to a temperature of from about 350°F. to about 400°F. At this point the ground tire rubber, consisting of tire peel ground to 95% passing the 16 mesh and 10% passing the 25 mesh (other gradations can be used) is added to the asphalt in a heated mixing tank. A reaction occurs between the hot asphalt and the rubber, which is characterized by a stiffening of the mixture which normally reaches an apparent end point after about one-half to about one hour after the rubber addition. At this point the viscosity does not materially increase, but levels off at a value of from about 2000 to about 50,000 centipoises (sometimes as high as 150,000 or 200,000 centipoises, depending upon the source and grade of asphalt and the granular size and percentage of rubber), depending primarily on the temperature and on the source and grade of the asphalt. The viscosity of the asphalt, at the start of the process, is preferably less than 100 centipoises. The asphalt and the outer surface of the rubber granules appear to react to form a reaction product interface that is neither asphalt nor rubber. This interface appears to resist the solvent effects of asphalt solvents to a much greater degree than asphalt or rubber.

The asphalt-rubber-jellied composition is allowed to cool to a temperature of from about 320° to about 340°F. At this point kerosene (boiling point about 350° to about 620°), generally in the amount of about 7.5 percent by volume of the asphalt-rubber-jellied composition is added. This lowers the viscosity to from about 1,000 to about 10,000 centipoises (depending on the temperature, amount of solvent, and the source and the grade of asphalt) making it suitable for spraying through a conventional distributor. It is understood that these viscosity numbers will vary with the grade and source of asphalt, fineness of the rubber, type of rubber, and type of solvent.

After the addition of the kerosene, the temperature usually drops to approximately 320°F. Any asphalt solvent could, of course, be used with proper temperature controls. Immediately after the addition of the kerosene, the material is applied to the surface to be treated in the usual amount of about 0.4 gallon to about 1.0 gallon of material per square yard of surface followed immediately by an application of ⅝ inch nominal size stone aggregate chips (for street repairs).

As soon as the chips are applied they are rolled into place, and at about this time a reaction occurs between the kerosene and the asphalt-rubber composition that results in a rapid increase in viscosity and the chips are "set" into place so that they are not dislodged by traffic. If the application of chips is delayed beyond the "set", the chips will not sufficiently adhere to the material to withstand vehicle traffic.

The "set" is not an evaporation phenomena, as all this is conducted at well below the boiling point of the kerosene, and tests have shown that loss of kerosene by evaporation is not involved. In fact, it is several months, if not years, before most of the kerosene eventually leaves the set material.

The addition of kerosene temporarily decreases the viscosity of the asphalt-rubber-jellied composition and allows the elastomeric material to be sprayed, pumped, or mixed with aggregates for a predetermined period of time before the viscosity again increases and "sets" the material. The viscosity of the elastomeric material is initially relatively low, and the viscosity changes very little for a short period, and then suddenly rises rather rapidly to approximately the viscosity of the asphalt-rubber-jellied composition, resulting in curing of the elastomeric material in a short period of time. This phenomenon is not exhibited by conventional solvent cut-back asphalts and the like. The elastomeric material of the present invention is sufficiently set after an hour to bear vehicular traffic which is not the case with conventional cut-back materials.

This sudden set or increase in viscosity of the elastomeric material of this invention is apparently the result of the solvent being selectively absorbed by the rubber granules after the solvent has had time to "break up" the reaction interface composition between the asphalt and the rubber. The characteristics and properties of the solvent-cut composition are surprising and quite unexpected. The phenomena applies to all of the hot asphalt-rubber compositions described herein.

We have checked this phenomena out with asphalt-rubber compositions varying from one part of rubber to 10 parts of asphalt, to 30 parts of rubber and 70 parts of asphalt. The curves which were made from the tests are shown in the drawings; all illustrate that variation in either rubber content or the solvent content can change the time interval between the drop in viscosity and subsequent increases in viscosity (rebound) back to the original level. Increases in solvent content, relative to rubber content, increases this "rebound" time period and vice versa.

Our tests have also shown that the rubber particle size affects the rapidity of the original change in viscosity and the amount of change.

The finer rubbers give higher viscosities more rapidly for the same rubber percentage. This is undoubtedly due to the higher surface area of the finer rubbers. Rubbers tested or observed in processes that showed this phenomena and the kerosene dilution phenomena are ground tire rubbers, tire buffings (a by-product of tire retreading), partially devulcanized ground tire rubber, and SBR crumb rubber.

For practical purposes for spraying with conventional equipment and mixing in an asphalt pugmill with the above composition, it appears that an initial reaction viscosity of 2,000 to 50,000 centipoises, which cuts back to 1,000 to 2,000 centipoises with the addition of solvent, is approximately ideal. Wider ranges varying from 200 to 300,000 centipoises for the asphalt-rubber composition down to 50 to 50,000 centipoises for the elastomeric material may be desirable for special purposes, such as use in roofing or special mixing equipment. The viscosity indicated by the graphs have all been run with either the Brookfield Synchro-Lectric Viscometer, using a number three or number four spindle, or with a Puzinauskas-Asphalt Institute Viscometer. For this material, the viscosity in centipoises approximates the viscosity in centistokes.

EXAMPLE 1

200–300 penetration grade paving asphalt was heated to a temperature of 400°F. over a period of several hours. At 400°F. the viscosity of the asphalt was approximately 53 centistokes. Sufficient ground tire rubber (16 to 25 mesh) was added to the hot asphalt to form an asphalt-rubber-jellied composition containing 10% rubber. Rubber and asphalt were thoroughly mixed and heated to maintain the temperature at 400°F. for about four hours. During this time the average viscosity of the mixture was about 80 centistokes.

EXAMPLE 2

Asphalt, 120–150 penetration grade asphalt, was heated to a temperature of 400°F. over several hours. At 400°F. the viscosity of the asphalt was 74 centistokes. Ground tire rubber (16–25 mesh) was then added to the hot asphalt and thoroughly mixed therewith. Sufficient rubber was added to the asphalt to form an asphalt-rubber composition containing 10% rubber. The resulting jellied composition was heated to a temperature of 400°F. After a little over an hour the viscosity of the mixture was about 88 centistokes. The composition was heated for about four hours, at which time its viscosity was about 72 centistokes, indicating partial depolymerization of the rubber at this point.

EXAMPLE 3

Asphalt, 85–100 penetration grade paving asphalt, was heated to a temperature 400°F. over a period of several hours, At 400°F., the asphalt had a viscosity of 60 centistokes. Ground tire rubber (16–25 mesh) was added to the hot asphalt and mixed therewith. Sufficient rubber was added to the asphalt to form an asphalt-rubber composition containing 10% rubber. The mixture was heated to a temperature of about 400°F. for about 4 hours. Fifteen minutes, after addition of the rubber, the viscosity of the resulting jellied composition was 95 centistokes. After 4 hours of heating, the viscosity of the mixture was about 75 centistokes.

When 60–70 penetration grade paving asphalt was utilized in place of 85–100 penetration grade paving asphalt in the above composition, the heated asphalt-rubber-jellied composition had a viscosity of about 110 centistokes one hour after the rubber was added and maintained that viscosity during the remainder of the four-hour heating period.

When 40–50 penetration grade paving asphalt was subtituted for 85–100 penetration grade paving asphalt in the above composition, the heated asphalt-rubber composition had a viscosity of about 143 centistokes about two hours after the rubber was initially added. The viscosity slowly fell to an average of about 137 centistokes at the end of the 4 hour heating period.

EXAMPLE 4

Asphalt, 60–70 penetration grade paving asphalt, was heated to a temperature of about 390°F. Ground tire rubber (16–25 mesh) was added in sufficient quantities to the hot asphalt to form an asphalt-rubber composition containing 33% rubber. The composition was thoroughly mixed for 10 minutes with heating. The reaction between the asphalt occurred rapidly at 390°F. The asphalt and rubber formed a jellied composition having the viscosity thickness equivalent to a heavy pancake batter. The resulting asphalt-rubber-jellied composition was allowed to cool to a temperature of approximately 250°F., at which time kerosene was added to the hot mixture and thoroughly mixed therein. The amount of kerosene added was equivalent to about 30% by volume of the asphalt-rubber reaction composition. The resulting elastomeric mixture was allowed to cool and then was stored in closed containers.

Some of the mixture was used for repairing a road surface in Phoenix, Arizona, which was subject to fatigue cracking with the characteristic "alligator" pattern cracking. The mixture was heated to a temperature of 100°F. and spread on the cracked surface in portions of about one gallon of the compopsition per square yard of street surface. Immediately thereafter, dry aggregate chips were applied to the surface of the spread mixture and tapped into the composition. Traffic was allowed on the treated surface within a few minutes after the completion of the overlay.

Similar overlays were made in March, April and May of 1970. At the time of the preparation of this application, these overlays are holding up very well under traffic and very little lateral deflection has occurred. The bond of the existing pavement is very good and the pavement cracking has not reflected through to the surface of the overlay.

EXAMPLE 5

The elastomeric mixture prepared in Example 4 was utilized in another overlay in July 1970 to repair a roadway subject to fatigue cracking. This particular overlay was covered with aggregate chips of minus ½ inch to plus ⅜ inch. These larger chips were not as easily engulfed by the composition as the smaller chips (−⅜ inch) utilized in the overlays described in the previous Example 4. This overlay was in excellent condition in December 1971 and had required no further maintenance or attention.

EXAMPLE 6

Paving grade asphalt (10–10 penetration grade, 4000 pounds) is heated to a temperature of 500°F. Rubber (reclaimed tire rubber, substantially SBR, BR and NR, − 4 to + 10 mesh, 1000 pounds) is mixed into the hot asphalt in a mixing tank for 10 minutes to produce a jellied asphalt-rubber composition. The reaction occurs rapidly at this temperature. The composition is allowed to cool to about 250°F. and 10% by volume solvent naphtha is added and mixed therein for one minute to form the elastomeric material of the present invention. This material is sprayed onto the surface to be treated and allowed to set, which occurs rapidly.

EXAMPLE 7

Asphalt, 85–100 penetration grade paving asphalt (Edgington), was heated to a temperature of about 350°F., wherein the viscosity is about 47 centipoises. Ground tire rubber, 16–25 mesh was added and mixed into the asphalt to form a rubber-asphalt mixture. Sufficient rubber was added to the asphalt to yield an asphalt-rubber composition containing 10% rubber. The viscosity of the composition maintained a value of about 365 centipoises (Puzinauskas-Asphalt Institute Viscometer) while the mixture was heated for a 3 ½ hour period at 320°F. The reaction between asphalt and rubber is relatively slow at 320°F. At the end of 3 ½ hours, kerosene was added to the composition (7½% by volume). Within an hour, the viscosity resulting elastomeric material had dropped to 200 centipoises. Four hours after the kerosene had been added, the viscosity of the mixture had rebounded to a value of about 280 centipises (see FIG. 3).

EXAMPLE 8

Paving grade asphalt (40–50 penetration grade, 3000 pounds) is heated to a temperature of 450°F. Rubber (partially devulcanized tire rubber, substantially SBR, BR and IR, − 8 to + 25 mesh, 1000 pounds) is mixed into the hot asphalt in a mixing tank for 15 minutes to produce a jellied-asphalt-rubber composition. The composition is allowed to cool to about 375°F. and 15% by volume petroleum (boiling point fraction 380°–420°F.) is added thereto and mixed therin for 2 minutes to form the elastomeric mterial of the present invention. This material is sprayed onto the suface to be treated in amounts of between about 0.2 and about 1 gallon per square yard of surface.

EXAMPLE 9

Asphalt, 120–150 penetration grade asphalt, was heated to a temperature of 370°F., wherein ground tire rubber (16–25 mesh, United States Standards) was mixed therein. Sufficient rubber was added to form an asphalt-rubber elastomeric composition containing 25% rubber. The mixture was heated to a temperature of 380°F., wherein the viscosity was about 2500 centipoises (Brookfield Viscometer). Therein kerosene was added to the composition (5% by volume) and the viscosity of the resulting material dropped to about 1700 centipoises. When the kerosene was added, the temperature dropped to 320°F.; the resulting elastomeric material was maintained at that temperature (sealed system) and the viscosity of the material rebounded to about 2800 centipoises within 60 minutes.

EXAMPLE 10

Paving grade asphalt (200–300 penetration grade, 2000 pounds) is heated to a temperature of 300°F. Rubber (tire rubber peelings, substantially SBR, BR and NR, − 16 to + 25 mesh, 1000 pounds) is mixed into the hot asphalt in a mixing tank for 90 minutes to produce a jellied-asphalt-rubber composition. The composition is allowed to cool to about 200°F. and 5% by volume of mixed chlorinated hydrocarbons (boiling point range 200° to 350°F.) is added and mixed therein for about 15 minutes to form the elastomeric material of the present invention.

EXAMPLE 11

Asphalt, 120–150 Los Angeles Basin penetration grade paving asphalt was heated to a temperature of about 350°F. At that temperature ground tire rubber was added to he asphalt in sufficient proportions to form an asphalt-rubber composition containing 25% of rubber. The rubber was finely ground at a mesh size of − 40 mesh (United States Standards) to dust particles. Upon the addition of rubber, viscosity of the composition rapidly increased to 36,000 centipoises. The material was heated to a temperature of 350°F. for an hour. During that time the viscosity of the material averaged about 240,000 centipoises.

The above experiment was repeated except that the ground tire rubber was selected from the sizes between − 4 and + 10 mesh (United States Standards). After the first 15 minutes of heating, the asphalt-rubber composition had a viscosity of 1100 centipoises. After 30 minutes, the viscosity had increased to 1300 centipoises. At the end of one hour the composition of the viscosity had increased to 5400 centipoises.

After the first hour of the heating, kerosene was added to four portions of the first composition containing − 40 to dust rubber described above. The first portion contained 5% by volume kerosene, the second portion contained 7.5% by volume kerosene, the third portion contained 10% by volume kerosene, and the fourth portion contained 20% by volume kerosene. The viscosity of the first portion dropped to 80,000 centipoises, which remained substantially level for a period of three hours. The second portion dropped the viscosity to around 30,000 centipoises, which remained substantially level for a three-hour period. The third portion dropped to a viscosity of about 16,000 centipoises, which remained substantially level for over three hours. The fourth portion dropped to a viscosity of 6,000 centipoises, which remained substantially level for a period of over three hours.

The above experiment shows that very finely ground rubber yields an asphalt-rubber-jellied composition with an extremely high viscosity, whereas less finely ground rubber yields a jellied composition having a more workable viscosity; that is, a viscosity of 50,000 centipoises or less. In addition the experiment illustrates that a material prepared from kerosene and an asphalt-rubber composition made with very fine rubber has no rebounding characteristics. It is for this reason that the applicants believe that the present elastomeric material must be prepared from ground rubber having a mesh size of at least + 50 (United States Standards).

EXAMPLE 12

Paving grade asphalt (85–100 penetration grade, 3500 pounds) is heated to a temperature of 425°F. Rubber (tire buffings, substantially SBR and NR, − 4 to + 50 mesh, 1000 pounds) is mixed into the hot asphalt in a mixing tank for 45 minutes to produce a jellied-asphalt-rubber composition. The composition is allowed to cool to about 300°F. and 7.5% by volume kerosene is added thereto and mixed therein for 15 minutes to form the elastomeric material.

EXAMPLE 13

About 16,000 pounds of 120–150 penetration grade paving asphalt were heated to 350°F. Thereafter ground tire rubber (− 16 to + 25 mesh) were added to the hot asphalt to hield a jellied-asphalt-rubber composition consisting of 24.4% by weight rubber. The mixture was allowed to cool to 285°F. and was equivalent to about 2750 gallons by stick. 215 gallons of kerosene were added to the hot mixture to yield a thick fluid elastomeric material. The material was sprayed on the pavement subject to fatigue cracking. The pavement temperature varied between 118° and 140°F. and the ambient temperature was 98°F. The mixture was applied at 270°F. in proportions of about 0.5 gallons of composition per square yard of pavement. Immediately after application, the overlays were covered with aggregate chips (about 33 pounds of chips per square yard overlay).

The above overlay as applied some eight months before the filing date of this application; and as of the filing date of this application it is in excellent condition showing very little wear, good adhesion to the underlying pavement, and no reflection of the underlying alligator cracking.

EXAMPLE 14

Paving grade asphalt (70–80 penetration grade, 2000 pounds) is heated to a temperature of 425°F. Rubber (reclaimed partially devulcanized tire rubber, substantially SBR − 25 to + 50 mesh, 1000 pounds) is mixed into the hot asphalt in a mixing tank for 25 minutes to produce a jellied-asphalt-rubber composition. The composition is allowed to cool to about 325°F. and 12½% by volume light oil fraction from coal tar (boiling point fraction 350–400°F.) is added thereto and mixed therein for 5 minutes to form the elastomeric material of the present invention.

EXAMPLE 15

The material described in Example 13 was applied to a thickened bituminous surface with no base, over a roadway area that is used as a median between the main street and the fronted street. This particular surface had repeated flexural failure. The pavement temperature was about 118°F. and the ambient temperature was around 100°F. The elastomeric material was applied by spray at temperatures between 250 and 270°F. at application rates of about .35 gallon of the material per square yard of pavement. As of the date of this application, the prepared surface (about 8 months old) is in excellent condition, except for some initial minor damage caused by "hot rodders" dragging over the freshly applied overlay.

EXAMPLE 16

Paving grade asphalt (120–150 penetration grade, 2500 pounds) is heated to a temperature of 390°F. Rubber (rubber scrap, substantially EPM, EPDM, IR and NR, − 16 to + 25 mesh, 1000 pounds) is mixed into the hot asphalt in a mixing tank for 60 minutes to produce a jellied-asphalt-rubber composition. The composition is allowed to cool to about 275°F. and 6% by volume diesel oil is added thereto and mixed therein for 30 minutes to form the elastomeric material of the present invention.

EXAMPLE 17

12,500 pounds (1650 gallons) of asphalt, 85–100 penetration grade paving asphalt, was heated to 400°F. together with 8 gallons of 30 weight lubricating oil. Thereafter, 4176 pounds of ground tire rubber (− 16 to + 25 mesh) was mixed in with the hot asphalt to form an asphalt-rubber composition (2,200 hot gallons by metering stick). The hot asphalt-rubber-jellied composition was allowed to cool to about 330°F., thereafter 220 gallons of kerosene was added to form a hot elastomeric material (313°F.) having a heavy fluid consistency. This material was sprayed on the pavement subject to fatigue cracking in seven different locations, some 2 to 3 hours after the initial addition of the rubber. The pavement temperature varied between 119° and 124°F. The ambient temperature was 63°F. and the temperature of the composition was 310°F. Between about 0.3 and about 0.9 gallon of the elastomeric material were applied for each square yard of pavement. Immediately after application the overlay was covered with wet aggregate chips (2% water).

The elastomeric material that remained was mixed with additional kerosene to form a mixture having 20% kerosene by volume. This material was sprayed on five different areas of pavement subject to fatigue cracking. Some 3 ½ to 4 hours after addition of the rubber, the pavement temperature was 120°F., the ambient temperature was about 62°F. and the temperature of the composition was between 265° and 275°F. The elastomeric material ha a thin fluid consistency and was applied to the pavement at an application rate of about 0.5 gallon of composition per square yard of pavement. The overlays were made some nine months prior to the filing of this application, and as of the filing date were in excellent condition, showing excellent wearability to traffic, not reflecting the underlying cracks and showing excellent adhesion to the underlying pavement.

EXAMPLE 18

Asphalt, 120–150 Phillips penetration grade paving asphalt, was heated to a temperature of about 375°F. Ground tire rubber (− 16 to + 25 mesh) was added to the asphalt and mixed thoroughly therein to form an asphalt-rubber-jellied composition having a viscosity of about 2500 centipoises at 375°F. Sufficient rubber was added to the asphalt to form an asphalt-rubber-jellied composition containing 25% rubber. Thereafter, kerosene was added to the mixture, 5% by volume. Immediately thereafter, the viscosity of the resulting elastomeric material dropped to a value of about 1700 centipoises which it maintained for about 5 to 10 minutes. Thereafter, in a period of less than two minutes the viscosity of the resulting elastomeric material increased to about 2400 centipoises, and 20 minutes thereafter increased to a viscosity of 2750 centipoises. The entire experiment was conducted in a sealed system and all viscosity measurements were taken with a Brookfield Viscometer (see FIG. 2).

The above method was repeated, except that the asphalt was heated to 350°F. and 7.5% by volume of kerosene was added. Five minutes after the kerosene was added, the viscosity of the resulting material had dropped to 1600 centipoises. About 35 minutes after the kerosene had been added, the viscosity of the resulting material had increased to a viscosity of about 2600 centipoises. One and one-half hours after the kerosene had been added, the viscosity of the resulting material had increased to 3500 centipoises (see FIG. 4). The above procedure was conducted under a sealed system in which no kerosene evaporated off and all viscosity measurements were taken with a Brookfield Viscometer (No. 3 spindle at 20 rpm).

Figure 3:
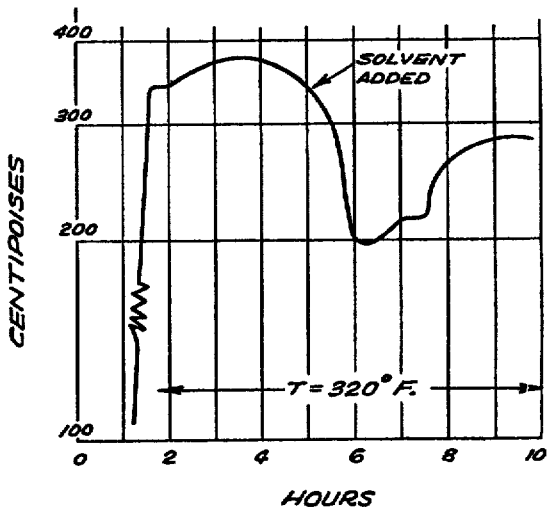
FIG. 3 is a graph showing the change in viscosity of an asphalt-rubber composition with respect to time.
Figure 2:
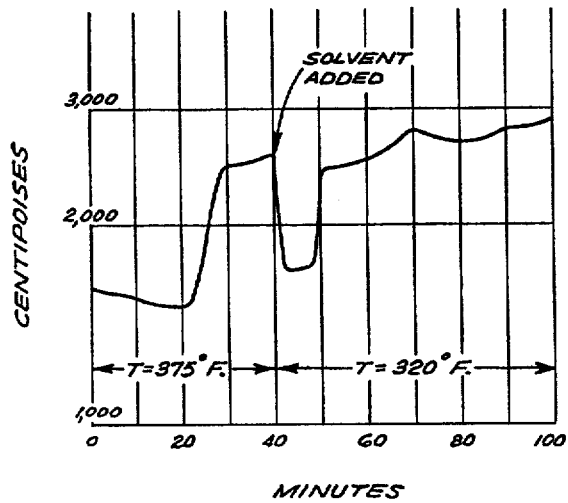
FIG. 2 is a graph showing the changes in the viscosity of one embodiment of the composition of this invention with respect to time.

The procedure of Example 11 was repeated employing 120–150 Douglas penetration grade paving asphalt and − 16 to + 25 mesh ground tire rubber. One hour after the addition of the rubber, the viscosity of the asphalt-rubber composition was 50,000 centipoises. Thereafter the composition was divided into three portions and mixed with kerosene. The first portion contained 7½% by volume kerosene; the second portion conained 10% by volume kerosene; and the third portion contained 20% by volume kerosene. The viscosity of the first portion initially dropped to 9000 centipoises, but within 20 minutes of the addition, the viscosity had rebounded back to 50,000 centipoises, and after about 50 minutes, the viscosity had increased to 60,000 centipoises. Initially the viscosity of the second portion dropped to 6000 centipoises that rebounded to 35,000 centipoises within 20 minutes wherein it remained level for the next hour. The viscosity of the third portion initially dropped to 2000 centipoises, rebounded to about 3000 centipoises after 30 minutes and had rebounded to 10,000 centipoises 50 minutes after the addition of the kerosene (see FIG. 1). FIGS. 1, 2 and 3 show the rebounding characteristics of the novel elastomeric material.

Figure 4:
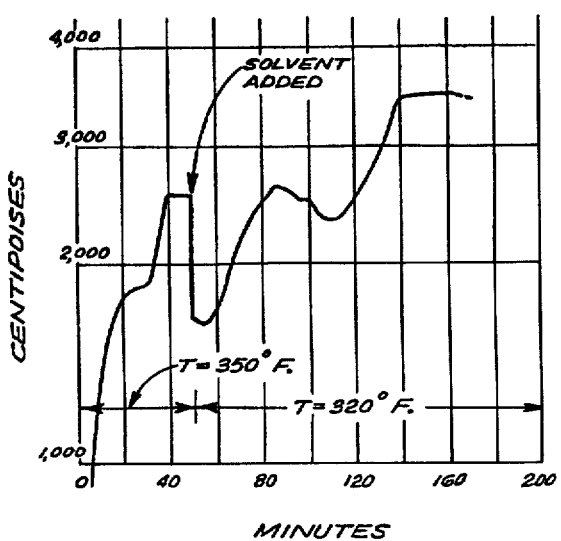
FIG. 4 is a graph showing the change in viscosity of another embodiment of the composition of the present invention.

A comparison of FIGS. 3 and 4 shows that the amount of rubber employed in the elastomeric material is critical. A low rubber material (10% rubber based on weight of asphalt and rubber) has very low viscosities and very poor rebound characteristics (FIG. 3).

What we claim as our invention is:

1. An elastomeric material comprised of a reaction product of paving asphalt, non-oil resistant, asphalt-soluble rubber, and an asphalt solvent; the material being prepared by heating the asphalt to a first temperature of from about 300° to about 500°F. to yield hot liquid asphalt having a viscosity of less than 200 centipoises; reacting between about 2 and about 4 parts by weight of the hot asphalt with one part of the rubber, granulated to a mesh size between − 4 and + 50, to form a jellied asphalt-rubber composition having a viscosity of from about 2000 to about 200,000 centipoises; allowing the jellied-asphalt-rubber composition to cool to a second temperature from about 200° to about 340°F.; mixing the cooled jellied-asphalt-rubber composition with from about 5 to about 20%, by volume of said composition, of the asphalt solvent, said solvet having a boiling point above said second temperature to form the elastomeric material having a viscosity of from about 1000 to about 10,000 centipoises.

2. The material as defined in claim 1 wherein the asphalt is heated first to a temperature of from about 350° to about 400°F.

3. The material as defined in claim 1 wherein the asphalt is 85–100 penetration grade paving asphalt.

4. The material as defined in claim 1 wherein the asphalt is 120–150 penetration grade paving asphalt.

5. The material as defined in claim 1 wherein the mesh size of the rubber is from about − 16 to about + 25.

6. The material as defined in claim 1 wherein said second temperature is from about 320° to about 340°F.

7. The material as defined in claim 1 wherein the asphalt and rubber are reacted by mixing them together for a period of from about 10 to about 90 minutes.

8. The material as defined in claim 1 wherein the asphalt-rubber-jellied composition is mixed with about 7½%, by volume of the composition, of the asphalt solvent.

9. The material as defined in claim 1 wherein the asphalt solvent is kerosene.

10. The elastomeric material as defined in claim 1 wherein said asphalt is selected from paving asphalts having a penetration grade of from about 10–10 to about 200–300.

11. The elastomeric material as defined in claim 1 wherein said rubber is an unvulcanized, vulcanized, or reclaimed rubber selected from the group consisting of natural rubbers, isoprene rubber, butadiene rubber, butadiene-styrene rubber, butyl rubber and ethylene propylene rubber.

12. The elastomeric material as defined in claim 1 wherein said rubber is selected from the following group: ground whole tires, with or without carcass fabric residue, tire buffings, ground innertubes and reclaimed rubber prepared from whole tires, tire buffings and ground inner-tubes.

13. The elastomeric material as defined in claim 1 wherein said solvent is selected from the group consisting of kerosene, aliphatic and aromatic hydrocarbons, solvent naphtha, ligroin, paint thinner, diesel oil, light oil fractions from coal tar, white gasoline, petroleum spirits, paraffinic oils, and halogenated hydrocarbons.

14. An elastomeric material comprised of a reaction product of paving asphalt, non-oil resistant, asphalt-soluble rubber, and an asphalt solvent; the material being prepared by heating the asphalt to a first temperature of from about 300°F to about 500°F to yield hot liquid asphalt; reacting between about 2 and about 4 parts by weight of the hot asphalt with one part of the rubber, to form a jellied asphalt-rubber composition; allowing the jellied-asphalt-rubber composition to cool to a second temperature from about 200° to about 340°F; mixing the cooled jellied-asphalt-rubber composition with from about 5 to about 20%, by volume of said composition, of the asphalt solvent to yield the elastomeric material.

15. The material as defined in claim 1 wherein the mesh size of the rubber is from about − 4 to about + 50.

16. The material as defined in claim 1 wherein the asphalt solvent has a boiling point greater than the second temperature.

17. The material as defined in claim 1 wherein the jellied asphalt-rubber composition has a viscosity of from about 2000 to about 200,000 centipoises; and the elastomeric material after mixing of the cooled jellied-asphalt-rubber composition with the asphalt solvent has a viscosity of from about 1000 to about 10,000 centipoises.

* * * * *